United States Patent
Watanabe

(10) Patent No.: US 9,380,191 B2
(45) Date of Patent: *Jun. 28, 2016

(54) SOLID-STATE IMAGING DEVICE, DRIVING METHOD, AND ELECTRONIC APPARATUS

(71) Applicant: Sony Corporation, Tokyo (JP)

(72) Inventor: Takaki Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,734

(22) Filed: Jun. 25, 2015

(65) Prior Publication Data

US 2015/0296103 A1    Oct. 15, 2015

Related U.S. Application Data

(63) Continuation of application No. 13/765,383, filed on Feb. 12, 2013, now Pat. No. 9,100,602.

(30) Foreign Application Priority Data

Mar. 6, 2012   (JP) .................................. 2012-049086

(51) Int. Cl.
*H04N 5/225* (2006.01)
*H04N 5/374* (2011.01)
*H04N 5/376* (2011.01)

(52) U.S. Cl.
CPC .............. *H04N 5/225* (2013.01); *H04N 5/374* (2013.01); *H04N 5/376* (2013.01); *H04N 5/3765* (2013.01)

(58) Field of Classification Search
None
See application file for complete search history.

(56) References Cited

U.S. PATENT DOCUMENTS

| | | | |
|---|---|---|---|
| 6,975,357 B1 | 12/2005 | Suzuki et al. | |
| 7,488,928 B2 | 2/2009 | Krymski | |
| 7,880,786 B2 | 2/2011 | Muramatsu | |
| 8,174,603 B2 | 5/2012 | Krymski | |
| 9,100,602 B2 * | 8/2015 | Watanabe | .............. H04N 5/374 |

FOREIGN PATENT DOCUMENTS

| | | |
|---|---|---|
| JP | 2000-165747 A | 6/2000 |
| JP | 2000-209503 A | 7/2000 |
| JP | 2005-311821 A | 4/2005 |
| JP | 2005-333265 A | 12/2005 |
| JP | 2006-229798 A | 8/2006 |
| JP | 2008-103647 A | 5/2008 |

OTHER PUBLICATIONS

Japanese Office Action issued Jan. 14, 2016 for corresponding Japanese Application No. 2012-049086.

* cited by examiner

*Primary Examiner* — Twyler Haskins
*Assistant Examiner* — Angel L Garces-Rivera
(74) *Attorney, Agent, or Firm* — Michael Best and Friedrich LLP

(57) ABSTRACT

Disclosed is a solid-state imaging device including a pixel array, two vertical scanning circuits, and a control part. The pixel array has a plurality of pixels arranged in a two-dimensional matrix form. The two vertical scanning circuits are configured to sequentially select and scan each of the pixels in a vertical direction per row. The control part is configured to generate, based on a mode signal corresponding to an imaging mode, a driving switch signal to stop driving of one of the two vertical scanning circuits.

17 Claims, 7 Drawing Sheets

SOLID-STATE IMAGING DEVICE, DRIVING METHOD, AND ELECTRONIC APPARATUS

CROSS REFERENCE TO RELATED APPLICATIONS

This is a Continuation application of U.S. patent application Ser. No. 13/765,383, filed on Feb. 12, 2013, which claims priority from Japanese Application JP 2012-049086, filed in the Japan Patent Office on Mar. 6, 2012, the entire contents of which being incorporated herein by reference.

BACKGROUND

The present disclosure relates to a solid-state imaging device, a driving method, and an electronic apparatus, and in particular, to a solid-state imaging device, a driving method, and an electronic apparatus capable of reducing a circuit size and a consumption power in an image sensor and realizing high speed.

In recent years, CMOS image sensors have been widely used as imaging devices. However, the CMOS image sensors may not realize the synchronicity of an entire image because their pixels are generally sequentially read.

That is, in a CMOS image sensor, a light charge generated and accumulated by a photoelectric conversion part is sequentially scanned and read (sequential scanning) for each pixel or for each row. In the case of the sequential scanning, i.e., in a case where a rolling shutter is employed as an electronic shutter, an exposure start and an exposure end for accumulating light charges may not be consistent among all the pixels. Therefore, the sequential scanning suffers from a problem where a distortion occurs in an imaging image when a moving object is imaged.

In order to perform the imaging of a high-speed-moving object that does not allow such an image distortion and perform a sensing operation that involves the synchronicity of an imaging image, a global shutter is employed as an electronic shutter where an exposure start and an exposure end are performed on all the pixels of a pixel array at the same timing.

In an image sensor that employs the global shutter as an electronic shutter, pixels have, for example, charge accumulation parts of semiconductor memories. The image senor that employs the global shutter simultaneously transfers charges from photodiodes to the semiconductor memories so as to be stored therein and then sequentially reads them, thereby ensuring the synchronicity of an entire image (see, for example, Japanese Patent Application Laid-open No. 2008-103647).

Moreover, in recent years, there has been an increased demand for causing the CMOS image sensors to have an increased number of pixels and increase their speeds. Accordingly, vertical scanning circuits that drive the pixels are also requested to correspond to the high speeds of the CMOS image sensors. For example, if the vertical scanning circuits are arranged on both sides of the pixels for high speed, the driving performance of the CMOS image sensors can be improved as compared with the case that the vertical scanning circuit is arranged on only one side of the pixels (see, for example, Japanese Patent Application Laid-open Nos. 2005-333265 and 2000-209503).

SUMMARY

However, if the vertical scanning circuits are arranged on both sides of the pixels for high speed, the areas of the CMOS image sensors are increased correspondingly. In addition, if power-supply PADs and GND (ground) PADs for driving the vertical scanning circuits are arranged on both sides, the areas of the CMOS image sensors are further increased.

Moreover, it should be appreciated that a consumption power is increased because the number of the vertical scanning circuits is doubled.

The present disclosure has been made in view of the above circumstances, and it is therefore desirable to reduce a circuit size and a consumption power in an image sensor and realize high speed.

According to an embodiment of the present disclosure, there is provided a solid-state imaging device including a pixel array, two vertical scanning circuits, and a control part. The pixel array has a plurality of pixels arranged in a two-dimensional matrix form. The two vertical scanning circuits are configured to sequentially select and scan each of the pixels in a vertical direction per row. The control part is configured to generate, based on a mode signal corresponding to an imaging mode, a driving switch signal to stop driving of one of the two vertical scanning circuits.

The control part may be further configured to generate and output a pixel driving pulse to sequentially select and scan each of the pixels arranged in the pixel array in the vertical direction per row. One of the two vertical scanning circuits may have a circuit to stop a supply of the pixel driving pulse to a driver of a transfer transistor based on the mode signal. The transfer transistor is configured to transfer a charge accumulated in a photoelectric conversion part of each of the pixels.

The mode signal may be a signal indicating one of a high-speed reading mode that involves high-speed reading of a pixel signal and a low-speed reading mode that does not involve the high-speed reading of the pixel signal. Both the two vertical scanning circuits may be driven when the mode signal indicating the high-speed reading mode is received. Driving of one of the two vertical scanning circuits may be stopped when the mode signal indicating the low-speed reading mode is received.

A power-supply terminal and a GND (ground) terminal connected to each of the two vertical scanning circuits may be provided at one of both right and left ends of the pixel array in a horizontal direction.

According to another embodiment of the present disclosure, there is provided a driving method. The driving method includes sequentially selecting and scanning, by two vertical scanning circuits, each of a plurality of pixels arranged in a pixel array in a two-dimensional matrix form in a vertical direction per row, and generating, by a control part, a driving switch signal to stop driving of one of the two vertical scanning circuits based on a mode signal corresponding to an imaging mode.

According to still another embodiment of the present disclosure, there is provided an electronic apparatus including a solid-state imaging device. The solid-state imaging device includes a pixel array, two vertical scanning circuits, and a control part. The pixel array has a plurality of pixels arranged in a two-dimensional matrix form. The two vertical scanning circuits are configured to sequentially select and scan each of the pixels in a vertical direction per row. The control part is configured to generate, based on a mode signal corresponding to an imaging mode, a driving switch signal to stop driving of one of the two vertical scanning circuits.

In the above embodiments of the present disclosure, with respect to the two vertical scanning circuits that sequentially select and scan each of the plurality of pixels arranged in the pixel array in the two-dimensional matrix form in the vertical direction per row, the driving switch signal to stop driving of one of the two vertical scanning circuits is generated based on the mode signal corresponding to the imaging mode.

According to the embodiments of the present disclosure, it is possible to reduce a circuit size and a consumption power in an image sensor and realize high speed.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

Figure 1:
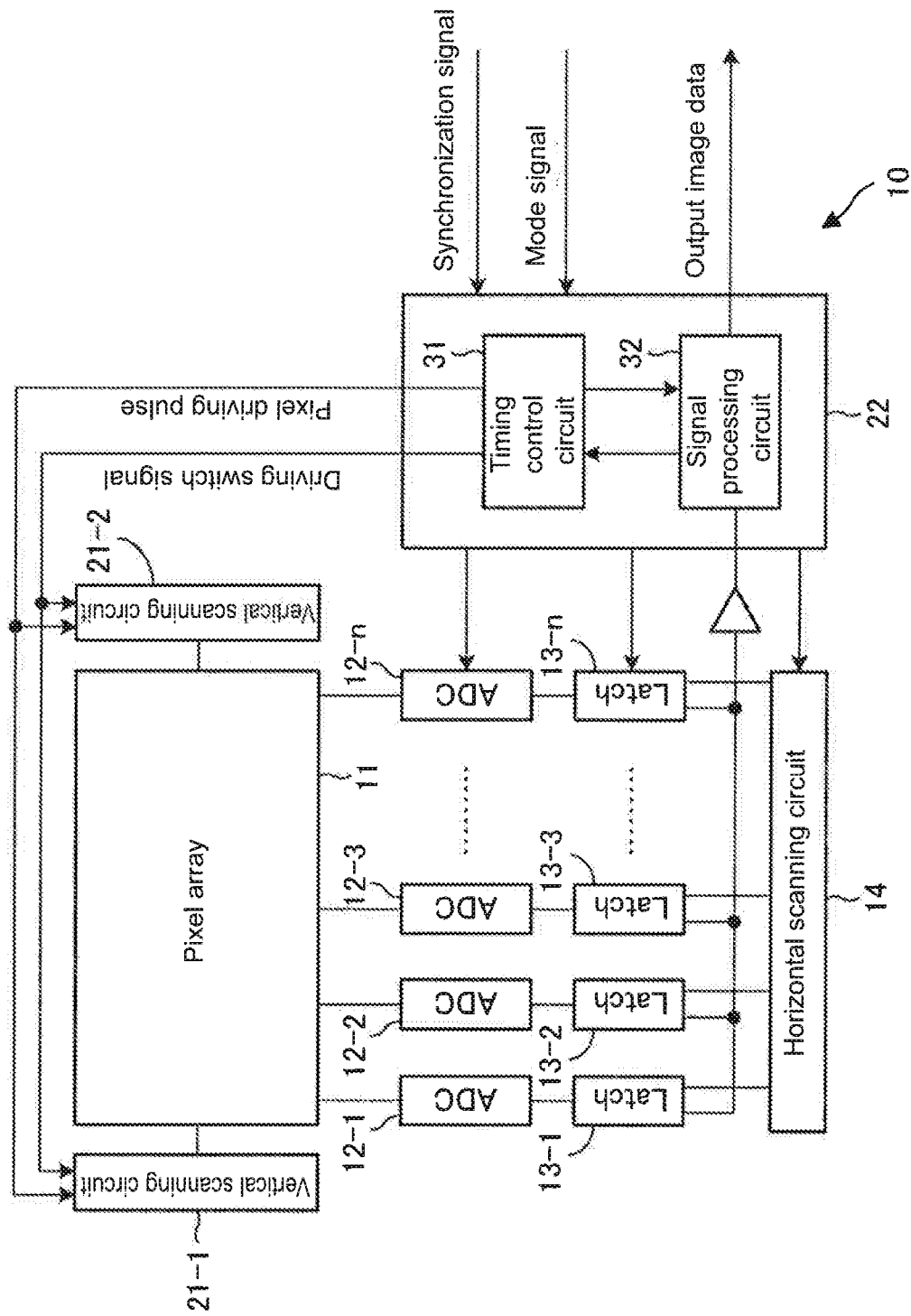
FIG. 1 is a block diagram showing a configuration example of a solid-state imaging device to which an embodiment of the present disclosure is applied.

FIG. 1 is a block diagram showing a configuration example of a solid-state imaging device to which the embodiment of the present disclosure is applied. A solid-state imaging device 10 shown in FIG. 1 is configured as, for example, a CMOS image sensor. The CMOS image sensor 10 can be switched between a rolling shutter mode and a global shutter mode as a mode of an electronic shutter.

In the rolling shutter mode, a light charge generated and accumulated by a photoelectric conversion part such as a photodiode is sequentially scanned and read for each pixel or for each row. In the global shutter mode, an exposure start and an exposure end are performed on all the pixels of a pixel array at the same timing.

Because the rolling shutter mode is a mode for use in imaging, for example, moving images, and resets less pixels at a time, its resetting load and consumption current are small. However, the rolling shutter mode involves high-speed reading.

On the other hand, because the global shutter mode is a mode for use in imaging, for example, still images, and resets all the pixels at a time, its resetting load and consumption current are large. However, the global shutter mode does not involve the high-speed reading.

The CMOS image sensor 10 shown in FIG. 1 has a pixel array 11, AD converters (denoted as ADCs) 12-1 to 12-n, latch circuits (denoted as Latches) 13-1 to 13-n, and a horizontal scanning circuit 14.

The pixel array 11 has a plurality of pixels arranged in a two-dimensional matrix form. Each of the pixels arranged in the pixel array 11 receives light and performs photoelectric conversion, thereby outputting a voltage value corresponding to an amount of the received light. Vertical signal lines are provided corresponding to the columns of the pixels arranged in the pixel array 11 in the matrix form.

The AD converters 12-1 to 12-n and the latch circuits 13-1 to 13-n are provided corresponding to the respective vertical signal lines.

For example, the AD converters 12-1 to 12-n compare the voltage values output from the pixels of the respective columns of the pixel array 11 with a reference voltage for digitization. The latch circuits 13-1 to 13-n hold the digitized values.

The horizontal scanning circuit 14 is composed of, for example, a shift resistor and sequentially outputs a horizontal scanning pulse, thereby selecting each of the latch circuits 13-1 to 13-n by turns and outputting a pixel signal to a control part 22.

In addition, the CMOS image sensor 10 has vertical scanning circuits 21-1 and 21-2.

The vertical scanning circuits 21-1 and 21-2 are composed of, for example, shift resistors. The vertical scanning circuits 21-1 and 21-2 select pixel driving wiring and apply a pixel driving pulse to the selected pixel driving wiring to drive the pixels per row. That is, the vertical scanning circuits 21-1 and 21-2 sequentially select and scan the pixels arranged in the pixel array 11 in a vertical direction per row.

For example, the simultaneous application of the pulses for driving the plurality of pixels arranged in the pixel array 11 with the vertical scanning circuits 21-1 and 21-2 makes it possible to drive the transistors of the respective pixels at a higher speed. In this manner, selection scanning can be performed at a higher speed compared with, for example, a case where each pixel is selected and scanned only by a single vertical scanning circuit.

Moreover, the CMOS image sensor 10 has the control part 22. The control part 22 has a timing control circuit 31 and a signal processing circuit 32. The control part 22 starts its operation as it receives a synchronization signal and a mode signal.

The timing control circuit 31 outputs the pixel driving pulse for driving the respective pixels arranged in the pixel array 11, thereby controlling the vertical scanning circuits 21-1 and 21-2. In addition, the timing control circuit 31 outputs a driving switch signal for controlling whether the vertical scanning circuit 21-1 among the vertical scanning circuits 21-1 and 21-2 is driven.

As the driving switch signal, one of "H" and "L" is output. For example, when "H" is output as the driving switch signal, the vertical scanning circuit 21-1 is controlled so as not to output the pixel driving pulse to the pixel driving wiring. The driving switch signal is output based on, for example, the mode signal output in accordance with a user's operation or the like.

For example, when the CMOS image sensor 10 operates in the rolling shutter mode that involves the high-speed reading, "L" is output as the driving switch signal to drive both the vertical scanning circuits 21-1 and 21-2. On the other hand, when the CMOS image sensor 10 operates in the global shutter mode that does not involve the high-speed reading, "H" is output as the driving switch signal to drive only one (for example, the vertical scanning circuit 21-2) of the two vertical scanning circuits.

The signal processing circuit 32 applies predetermined processing to the pixel signal supplied from each of the latch circuits 13-1 to 13-n to generate image data and outputs the image data.

As described above, because the CMOS image sensor having the two vertical scanning circuits can cause both the vertical scanning circuits to simultaneously supply the currents for driving the pixels, it becomes possible to read the pixel signals at a higher speed compared with a case where the CMOS image sensor has one vertical scanning circuit. On the other hand, the CMOS image sensor having the two vertical scanning circuits arises a concern about an increase in a consumption current and easily causes an increase in a circuit size.

Figure 2:
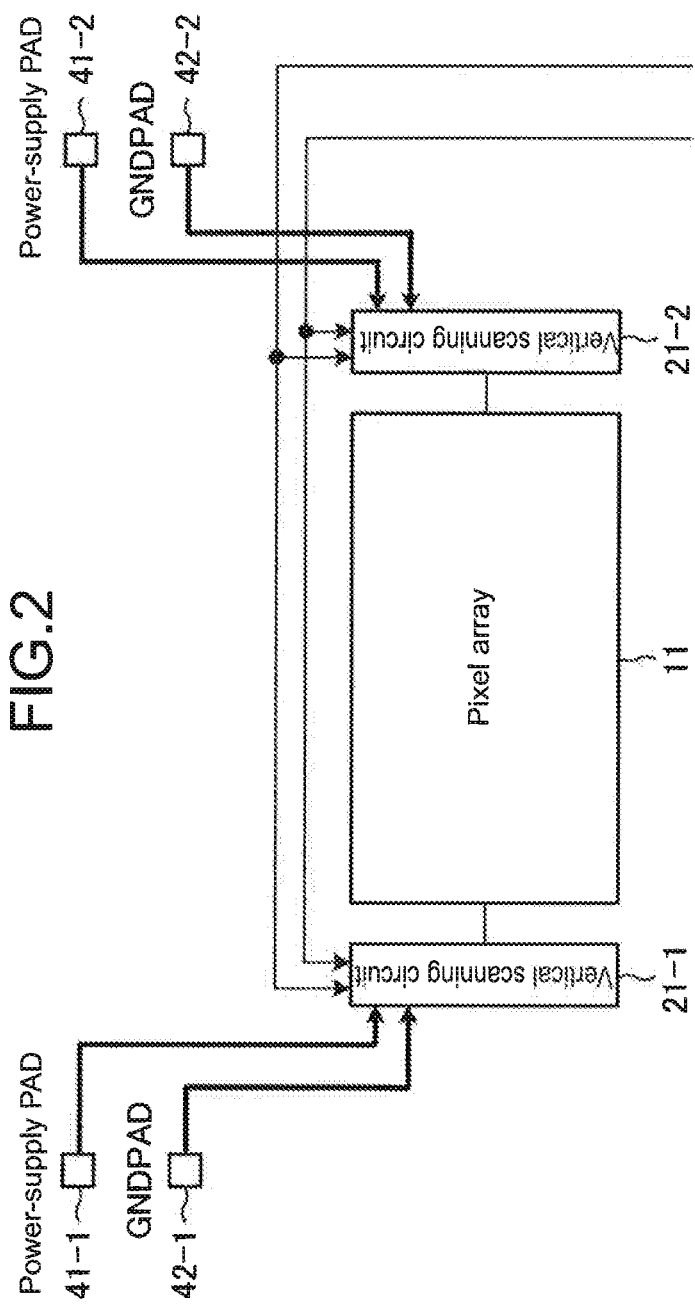
FIG. 2 is a diagram showing an arrangement example of power-supply PADs and GND (ground) PADs for driving vertical scanning circuits.

For example, when power-supply PADs and GND (ground) PADs for driving the vertical scanning circuits are arranged on both right and left sides as shown in FIG. 2, the circuit area of the entire CMOS image sensor 10 is increased. In the example of FIG. 2, a power-supply PAD 41-1 and a GND (ground) PAD 42-1 for driving the vertical scanning circuit 21-1 are provided on the left side, and a power-supply PAD 41-2 and a GND (ground) PAD 42-2 for driving the vertical scanning circuit 21-2 are provided on the right side.

Figure 3:
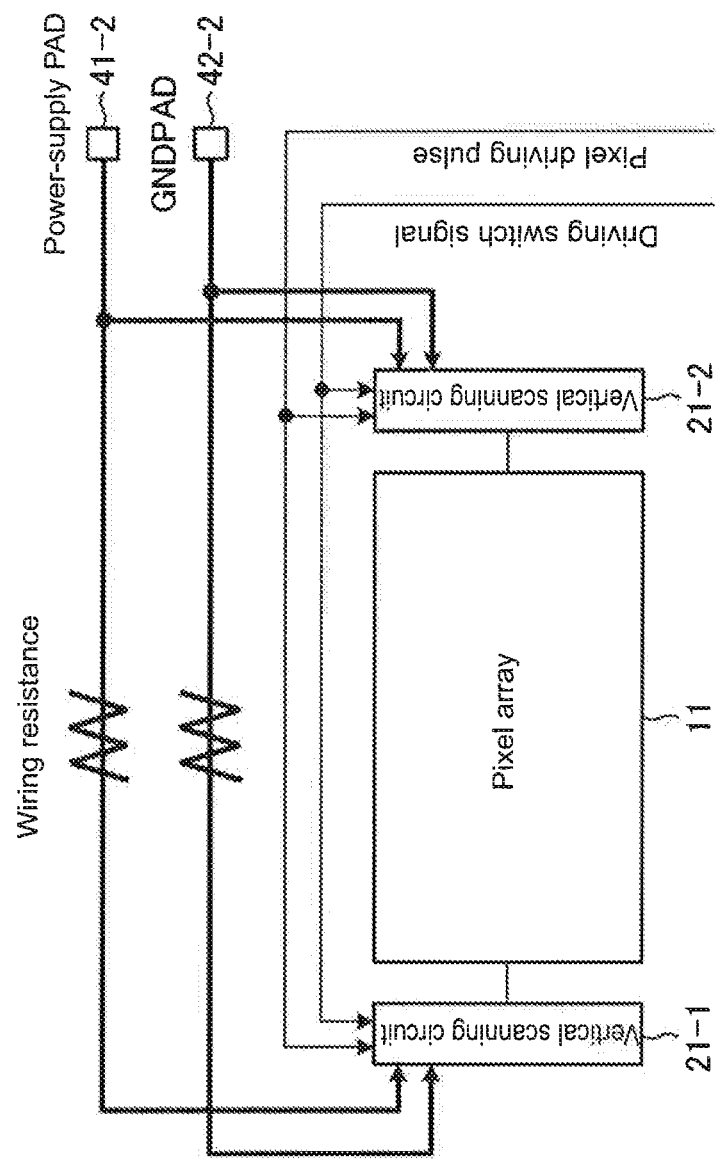
FIG. 3 is a diagram showing another arrangement example of the power-supply PAD and the GND (ground) PAD for driving the vertical scanning circuits.

For example, the arrangement of the power-supply PAD and the GND (ground) PAD for driving the vertical scanning circuits on only one side as shown in FIG. 3 makes it possible to reduce an increase in the circuit area of the entire CMOS image sensor 10. In the example of FIG. 3, the power-supply PAD 41-2 and the GND (ground) PAD 42-2 provided on the right side are shared by the vertical scanning circuits 21-1 and 21-2.

However, in a case where the CMOS image sensor 10 is configured in the manner as shown in FIG. 3, wiring that connects the vertical scanning circuit 21-1 to the PADs becomes long and the resistance of the wiring is increased. In this case, for example, the vertical scanning circuit 21-1 may not normally operate.

Figure 4:
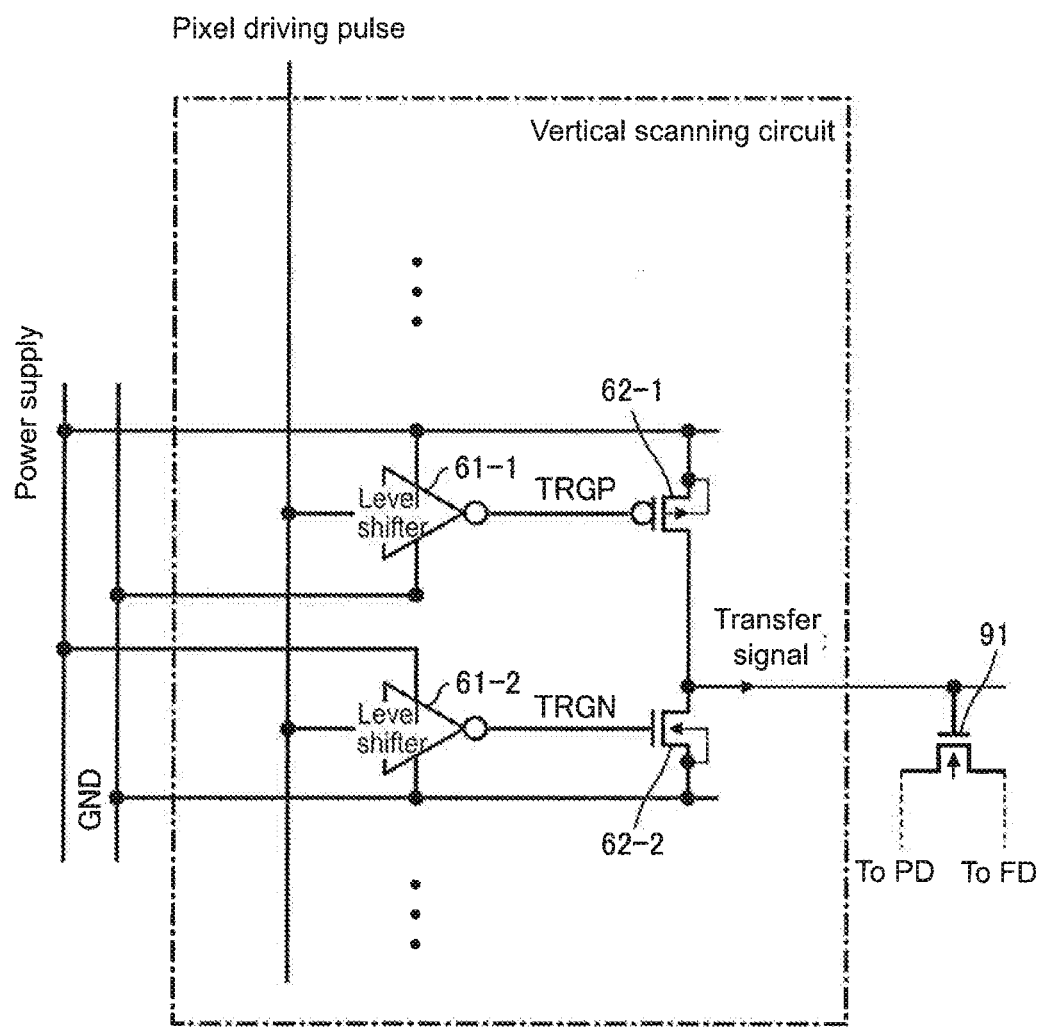
FIG. 4 is a diagram showing an inner configuration example of a typical vertical scanning circuit.

FIG. 4 is a diagram showing an inner configuration example of a typical vertical scanning circuit. In FIG. 4, only parts used to perform selection scanning for one row inside the vertical scanning circuit are shown in a magnified manner. Actually, the same configurations as those shown in FIG. 4 are provided by the number of the pixels arranged in the pixel array 11.

In the case of the configuration shown in FIG. 4, power-supply wiring, GND (ground) wiring, and wiring for a pixel driving pulse are each connected to level shifters 61-1 and 61-2. In the level shifters 61-1 and 61-2, their output voltages become "L" when the pixel driving pulse is received.

The level shifter 61-1 is connected to a PMOS transistor 62-1. The level shifter 61-2 is connected to an NMOS transistor 62-2. The output of the level shifter 61-1 serves as a trigger (TRGP) for driving the PMOS transistor 62-1, and the output of the level shifter 61-2 serves as a trigger (TRGN) for driving the NMOS transistor 62-2.

When the PMOS transistor 62-1 is turned on, a transfer transistor 91 of the pixel arranged in the pixel array 11 is turned on. When the transfer transistor 91 is turned on, a charge accumulated in the photodiode of the pixel is transferred to a floating diffusion. On the other hand, when the NMOS transistor 62-2 is turned on, the transfer transistor 91 is turned off.

Because the PMOS transistor 62-1 and the NMOS transistor 62-2 control the driving of the transfer transistor 91 as described above, they are also called drivers.

The PMOS transistor 62-1 is turned on when the output voltage of the level shifter 61-1 is "L" and turned off when the output voltage of the level shifter 61-1 is "H." The NMOS transistor 62-2 is turned on when the output voltage of the level shifter 61-2 is "H" and turned off when the output voltage of the level shifter 61-2 is "L."

That is, one of the PMOS transistor 62-1 and the NMOS transistor 62-2 is consistently turned on, while the other of PMOS transistor 62-1 and the NMOS transistor 62-2 is consistently turned off. However, when the wiring that connects the vertical scanning circuit 21-1 to the PADs becomes long and the resistance of the wiring is increased as described above, the operations of the level shifters 61-1 and 61-2 become unstable, which creates a state where both the PMOS transistor 62-1 and the NMOS transistor 62-2 are temporarily turned on.

Figure 5:
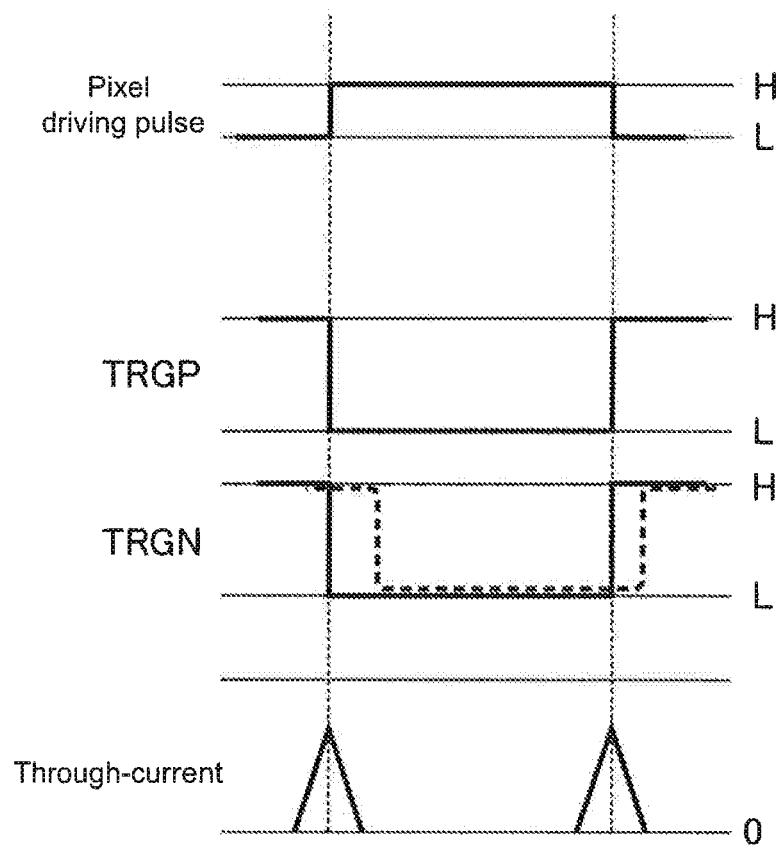
FIG. 5 is a diagram showing the waveforms of signals in the vertical scanning circuit shown in FIG. 4.

FIG. 5 is a diagram showing the waveforms of signals in the vertical scanning circuit shown in FIG. 4. In FIG. 5, the horizontal axis represents time, and the waveforms of the pixel driving pulse, the TRGP, and the TRGN are shown in this order from the top to the bottom. In the example of FIG. 5, the waveforms of the TRGP and the TRGN become "L" at a timing at which the pixel driving pulse becomes "H."

However, when the operations of the level shifters 61-1 and 61-2 become unstable, the waveforms of the TRGP and the TRGN may not become "L" at the timing at which the pixel driving pulse becomes "H." For example, the rising/falling of the waveform of the TRGN may not synchronize with the rising/falling of the pixel driving pulse as shown by dotted lines in FIG. 5.

For example, when the waveform of the TRGN becomes one shown by the dotted lines in FIG. 5, both the PMOS transistor 62-1 and the NMOS transistor 62-2 are turned on at the rising time and the falling time of the pixel driving pulse.

When both the PMOS transistor 62-1 and the NMOS transistor 62-2 are turned on, the power-supply wiring and the GND (ground) wiring are connected to each other, which results in the flowing of a through-current. The waveform of the through-current is shown in the lowest part of FIG. 5.

When the through-current is generated as described above, a consumption power is naturally increased and the operations or the like of other parts in the CMOS image sensor 10 may also be influenced.

In view of this, according to the embodiment of the present disclosure, one of the two vertical scanning circuits is not allowed to be driven in a case where the high-speed reading is not requested. In this case, the vertical scanning circuits are configured in the manner as shown in, for example, FIG. 6.

Figure 6:
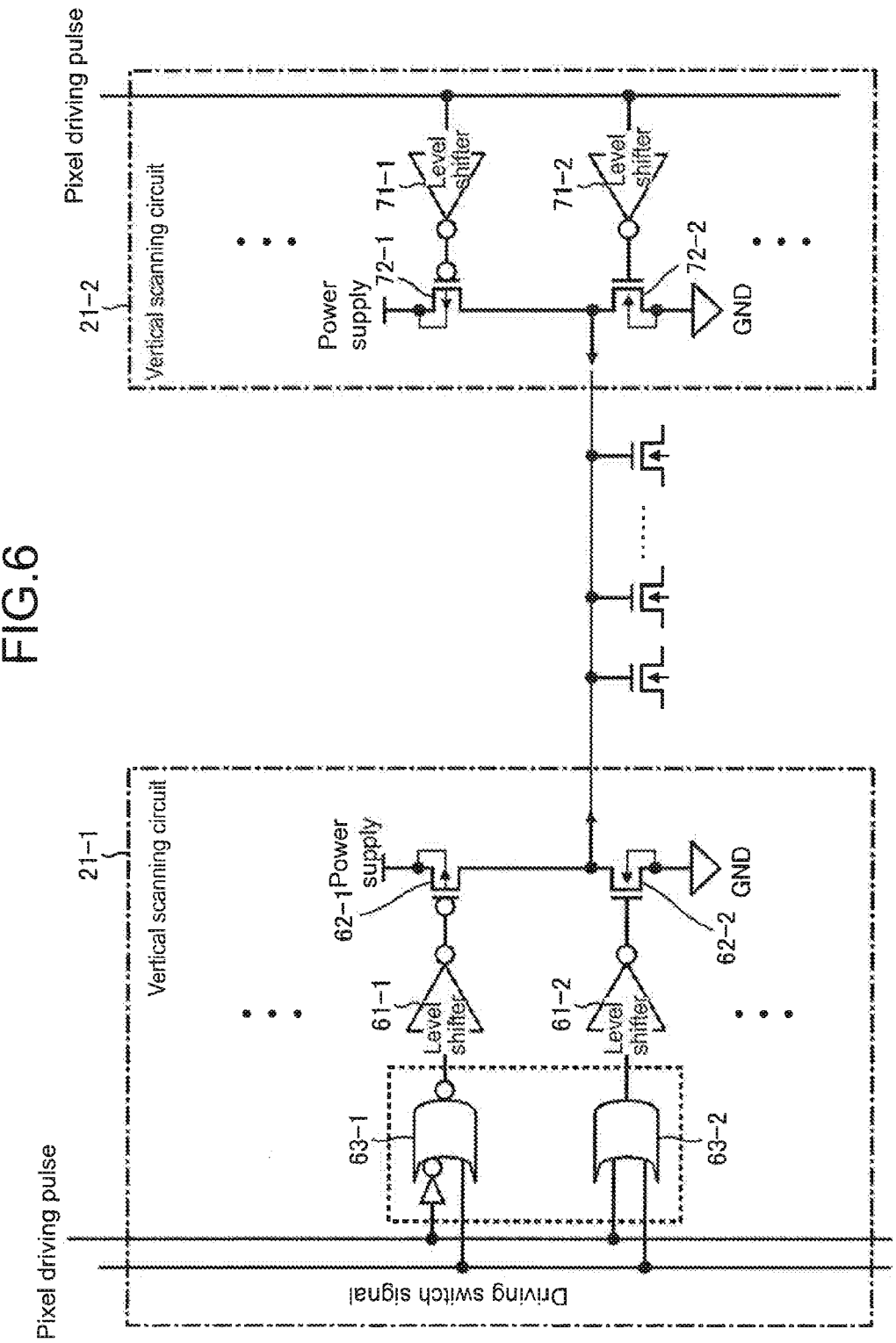
FIG. 6 is a diagram showing an inner configuration example of the vertical scanning circuits to which the embodiment of the present disclosure is applied.

FIG. 6 is a diagram showing an inner configuration example of the vertical scanning circuits to which the embodiment of the present disclosure is applied. In FIG. 6, only parts used to perform selection scanning for one row inside the vertical scanning circuits are shown in a magnified manner. Actually, the same configurations as those shown in FIG. 6 are provided by the number of the pixels arranged in the pixel array 11. In this example, when "H" is output as the driving switch signal, the vertical scanning circuit 21-1 among the two vertical scanning circuits is not allowed to be driven.

In the case of the configuration shown in FIG. 6, wiring for the driving switch signal and wiring for the pixel driving pulse are each connected to an NOR gate 63-1 and an OR gate 63-2 in the vertical scanning circuit 21-1. Note that the wiring for the pixel driving pulse is connected to the NOR gate 63-1 via an inverter. Further, the outputs of the NOR gate 63-1 and the OR gate 63-2 are supplied to the level shifters 61-1 and 61-2, respectively. Although omitted in FIG. 6, the level shifters 61-1 and 61-2 are connected to the power-supply wiring and the GND (ground) wiring as in the case of FIG. 2.

In the case of the configuration shown in FIG. 6, when "H" is output as the driving switch signal, the output of the NOR gate 63-1 consistently becomes "L" and the output of the level shifter 61-1 consistently becomes "H" regardless of the pixel driving pulse. Accordingly, in the case of the configuration shown in FIG. 6, when "H" is output as the driving switch signal, the PMOS transistor 62-1 is consistently turned off.

In addition, in the case of the configuration shown in FIG. 6, when "H" is output as the driving switch signal, the output of the OR gate 63-2 consistently becomes "H" and the output of the level shifter 61-2 consistently becomes "L" regardless of the pixel driving pulse. Accordingly, in the case of the configuration shown in FIG. 6, when "H" is output as the driving switch signal, the NMOS transistor 62-2 is consistently turned off.

That is, in the case of the configuration shown in FIG. 6, when "H" is output as the driving switch signal, the PMOS transistor 62-1 and the NMOS transistor 62-2 are consistently turned off. Therefore, no through-current is generated.

Further, in the case of the configuration shown in FIG. 6, when "L" is output as the driving switch signal, the output of the NOR gate 63-1 changes into "L" or "H" in accordance with the pixel driving pulse. Then, the output of the level shifter 61-1 changes into "H" or "L" so as to consistently have a polarity opposite to that of the pixel driving pulse. Accordingly, in the case of the configuration shown in FIG. 6, when "L" is output as the driving switch signal, the PMOS transistor 62-1 is controlled to be turned on or off by the pixel driving pulse.

Moreover, in the case of the configuration shown in FIG. 6, when "L" is output as the driving switch signal, the output of the OR gate 63-2 changes into "L" or "H" in accordance with the pixel driving pulse. Then, the output of the level shifter 61-2 changes into "H" or "L" so as to consistently have a polarity opposite to that of the pixel driving pulse. Accordingly, in the case of the configuration shown in FIG. 6, when "H" is output as the driving switch signal, the NMOS transistor 62-2 is controlled to be turned off or turned on by the pixel driving pulse.

On the other hand, in the case of the configuration shown in FIG. 6, level shifters 71-1 and 71-2 are provided with the wiring for the pixel driving pulse in the vertical scanning circuit 21-2. The output of the level shifter 71-1 serves as a trigger (TRGP) for driving a PMOS transistor 72-1, and the output of the level shifter 71-2 serves as a trigger (TRGN) for driving an NMOS transistor 72-2. Note that although omitted in FIG. 6, the level shifters 71-1 and 71-2 are connected to the power-supply wiring and the GND (ground) wiring shown in FIG. 2 as in the case of the level shifters 61-1 and 61-2.

In the vertical scanning circuit 21-2, the NOR gate 63-1 and the OR gate 63-2 as surrounded by dotted lines in the vertical scanning circuit 21-1 are not provided. That is, in the case of the configuration shown in FIG. 6, the vertical scanning circuit 21-2 operates in the same manner as the typical vertical scanning circuit. However, because the vertical scanning circuit 21-2 is closer to the PADs 41-2 and 42-2 as shown in FIG. 3, the wiring that connects the vertical scanning circuit 21-2 to the PADs becomes short and the resistance of the wiring is small. Accordingly, in the vertical scanning circuit 21-2, the operations of the level shifters 71-1 and 71-2 do not become unstable, and a through-current is hardly generated.

The driving switch signal is set to "H," for example, when the mode signal corresponding to the global shutter mode is supplied to the control part 22 and set to "L," for example, when the mode signal corresponding to the rolling shutter mode is supplied to the control part 22. Thus, in the global shutter mode, only one of the two vertical driving circuits can be driven. While, in the rolling shutter mode that involves the high-speed reading, both the two vertical driving circuits can be driven.

Thus, in the CMOS image sensor 10 to which the embodiment of the present disclosure is applied, only the vertical scanning circuit 21-2 is driven, for example, in the global shutter mode that does not involve the high-speed reading. This is because the operations of the level shifters 71-1 and 71-2 do not become unstable and a through-current is hardly generated in the vertical scanning circuit 21-2 as described above.

On the other hand, in the CMOS image sensor 10 to which the embodiment of the present disclosure is applied, both the vertical scanning circuits 21-1 and 21-2 are driven, for example, in the rolling shutter mode that involves the high-speed reading.

In the rolling shutter mode, the pixels for one row are reset in a single reset operation. On the other hand, in the global shutter mode, all the pixels arranged in the pixel array 11 are reset in the single reset operation. That is, in the rolling shutter mode, a power for the single reset operation becomes small, and the operations of the level shifters 61-1 and 61-2 rarely become unstable even if the wiring that connects the vertical scanning circuit 21-1 to the PADs has a large resistance value. For this reason, in the rolling shutter mode, a through-current is hardly generated even when the vertical scanning circuit 21-1 is driven.

Accordingly, in the CMOS image sensor 10 to which the embodiment of the present disclosure is applied, a through-current is hardly generated both in the global shutter mode and the rolling shutter mode. Therefore, a consumption power can be reduced.

In addition, in the CMOS image sensor 10 to which the embodiment of the present disclosure is applied, the power-supply PAD and the GND (ground) PAD can be arranged on only the one side as described with reference to, for example, FIG. 3. Therefore, it is possible to reduce an increase in the circuit area of the entire CMOS image sensor 10.

As described above, according to the embodiment of the present disclosure, a reduction in a circuit size and a consumption power in an image sensor and high speed can be realized.

Note that the application of the embodiment of the present disclosure is not limited to, for example, a solid-state imaging device such as a CMOS image sensor. That is, the embodiment of the present disclosure is applicable to any electronic apparatuses using solid-state imaging devices as image capturing parts (photoelectric conversion parts), such as imaging apparatuses like digital still cameras and video cameras, mobile terminal apparatuses having an imaging function, and copiers using solid-state imaging devices as image reading parts. The solid-state imaging devices may be a one-chip form, a form where a plurality of chips are laminated or adjacently arranged, or a module-like form having an imaging function where an imaging part and a signal processing circuit or an optical system are integrated and packaged.

Figure 7:
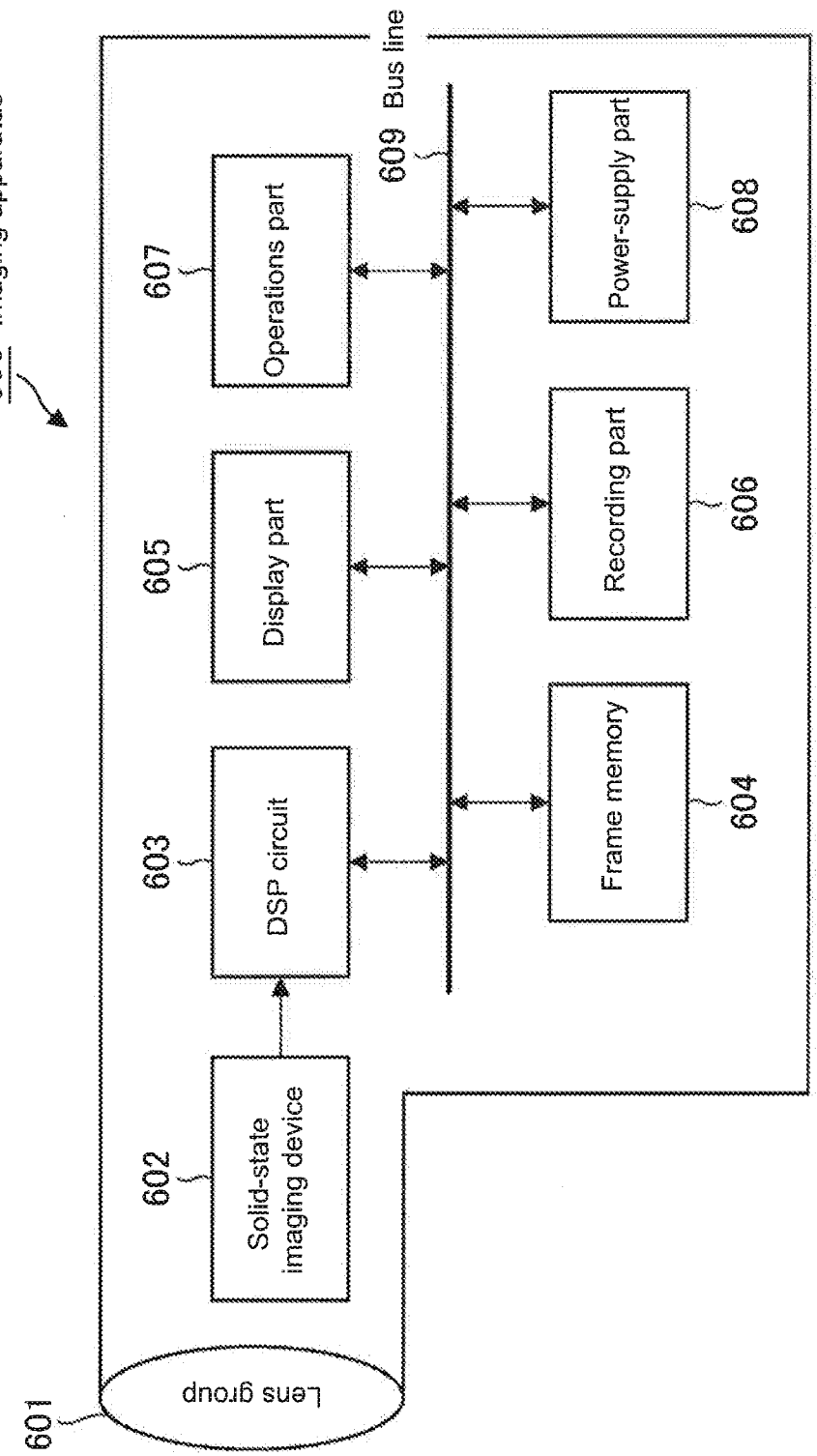
FIG. 7 is a block diagram showing a configuration example of an imaging apparatus serving as an electronic apparatus to which the embodiment of the present disclosure is applied.

FIG. 7 is a block diagram showing a configuration example of an imaging apparatus serving as an electronic apparatus to which the embodiment of the present disclosure is applied.

An imaging apparatus 600 shown in FIG. 7 has an optical part 601 composed of a lens group and the like, a solid-state imaging device (imaging device) 602 that employs the respective configurations of the pixels described above, and a DSP (Digital Signal Processing) circuit 603 serving as a camera signal processing circuit. In addition, the imaging apparatus 600 has a frame memory 604, a display part 605, a recording part 606, an operations part 607, and a power-supply part 608. The DSP circuit 603, the frame memory 604, the display part 605, the recording part 606, the operations part 607, and the power-supply part 608 are connected to each other via a bus line 609.

The optical part 601 receives incident light (image light) from an object to form an image on the imaging surface of the solid-state imaging device 602. The solid-state imaging device 602 converts a light amount of the incident light, which is formed into the image on the imaging surface by the optical part 601, into an electric signal per pixel and outputs the electric signal as a pixel signal. As the solid-state imaging device 602, a solid-state imaging device such as the CMOS image sensor 10 according to the embodiment described above, i.e., a solid-state imaging device capable of realizing imaging that causes no distortion with global exposure can be used.

The display part 605 is composed of, for example, a panel display unit such as a liquid crystal panel and an organic EL (Electro Luminescence) panel and displays moving images or still images imaged by the solid-state imaging device 602 thereon. The recording part 606 records the moving images or the still images imaged by the solid-state imaging device 602 on recording media such as video tapes and DVDs (Digital Versatile Disks).

The operations part 607 issues operating commands on various functions of the imaging apparatus 600 under user's operations. The power-supply part 608 appropriately supplies various power supplies serving as power supplies for operating the DSP circuit 603, the frame memory 604, the display part 605, the recording part 606, and the operations part 607 to such objects.

As described above, when the CMOS image sensor 10 according to the embodiment is used as the solid-state imaging device 602, it becomes possible to accurately eliminate reset noise at the extraction of a first pixel signal and a second pixel signal without adding a signal. Therefore, in the imaging apparatus 600 such as a video camera, a digital still camera, and a camera module for mobile equipment such as a mobile phone, the high quality of an imaging image can be achieved.

In addition, the embodiment described above is applied to the CMOS image sensor where the unit pixels that detect signal charges corresponding to light amounts of visible light as physical amounts are arranged in the matrix form. The embodiment of the present disclosure is not limited to the CMOS image sensor but is applicable to any column-type solid-state imaging devices where a column processing part is arranged for each pixel column in a pixel array part.

Moreover, the embodiment of the present disclosure is not limited to solid-state imaging devices that detect the distribution of incident light amounts of visible light to be imaged as images but is applicable to solid-state imaging devices that detect the distribution of incident light amounts of infrared rays, X rays, particles, or the like to be imaged as images. Furthermore, in a broad sense, the embodiment of the present disclosure is applicable to any solid-state imaging devices (physical-amount distribution detectors) such as finger print detection sensors that detect the distribution of other physical amounts such as pressures and capacitances to be imaged as images.

Note that a series of the processing described above in the specification includes not only processing chronologically performed in the described order but also processing not chronologically performed but performed in parallel or separately.

Furthermore, the present disclosure is not limited to the embodiment described above and may be modified in various ways without departing from the sprit of the present disclosure.

Note that the present disclosure may also employ the following configurations.

(1) A solid-state imaging device, including:
a pixel array having a plurality of pixels arranged in a two-dimensional matrix form;
two vertical scanning circuits configured to sequentially select and scan each of the pixels in a vertical direction per row; and
a control part configured to generate, based on a mode signal corresponding to an imaging mode, a driving switch signal to stop driving of one of the two vertical scanning circuits.

(2) The solid-state imaging device according to (1), in which
the control part is further configured to generate and output a pixel driving pulse to sequentially select and scan each of the pixels arranged in the pixel array in the vertical direction per row, and
one of the two vertical scanning circuits has a circuit to stop a supply of the pixel driving pulse to a driver of a transfer transistor based on the mode signal, the transfer transistor being configured to transfer a charge accumulated in a photoelectric conversion part of each of the pixels.

(3) The solid-state imaging device according to (1) or (2), in which
the mode signal is a signal indicating one of a high-speed reading mode that involves high-speed reading of a pixel signal and a low-speed reading mode that does not involve the high-speed reading of the pixel signal,
both the two vertical scanning circuits are driven when the mode signal indicating the high-speed reading mode is received, and
driving of one of the two vertical scanning circuits is stopped when the mode signal indicating the low-speed reading mode is received.

(4) The solid-state imaging device according to any one of (1) to (3), in which
a power-supply terminal and a GND (ground) terminal connected to each of the two vertical scanning circuits are provided at one of both right and left ends of the pixel array in a horizontal direction.

(5) A driving method, including:
sequentially selecting and scanning, by two vertical scanning circuits, each of a plurality of pixels arranged in a pixel array in a two-dimensional matrix form in a vertical direction per row; and
generating, by a control part, a driving switch signal to stop driving of one of the two vertical scanning circuits based on a mode signal corresponding to an imaging mode.

(6) An electronic apparatus, including:
a solid-state imaging device including
a pixel array having a plurality of pixels arranged in a two-dimensional matrix form,
two vertical scanning circuits configured to sequentially select and scan each of the pixels in a vertical direction per row, and
a control part configured to generate, based on a mode signal corresponding to an imaging mode, a driving switch signal to stop driving of one of the two vertical scanning circuits.

The present disclosure contains subject matter related to that disclosed in Japanese Priority Patent Application JP 2012-049086 filed in the Japan Patent Office on Mar. 6, 2012, the entire content of which is hereby incorporated by reference.

What is claimed is:
1. An imaging device, comprising:
a pixel array including a plurality of pixels;

two vertical scanning circuits configured to supply a driving signal to at least one of the plurality of pixels; and control circuitry configured to supply a driving switch signal based on a mode signal to the two vertical scanning circuits, wherein the two vertical scanning circuits are configured to supply the driving signal when the mode signal indicating a high-speed reading mode is received, and wherein one of the two vertical scanning circuits is configured to stop the supply of the driving signal when the mode signal indicating a low-speed reading mode is received.

2. The imaging device according to claim 1, wherein the plurality of pixels are arranged in a matrix form.

3. The imaging device according to claim 1, wherein the two vertical scanning circuits are respectively configured to drive at least one of the pixels in a vertical direction per row.

4. The imaging device according to claim 1, wherein the high-speed reading mode corresponds to a rolling shutter mode.

5. The imaging device according to claim 4, wherein the low-speed reading mode corresponds to a global shutter mode.

6. The imaging device according to claim 4, wherein the rolling shutter mode allows a light charge generated by a photodiode to be read pixel by pixel or row by row.

7. The imaging device according to claim 5, wherein the global shutter mode allows an exposure start and an exposure end to be performed on the pixels simultaneously.

8. The imaging device according to claim 1, wherein one of the two vertical scanning circuits has a circuit to stop a supply of the pixel driving pulse to a driver of a transfer transistor, the transfer transistor being configured to transfer a charge accumulated in a photoelectric conversion part of each of the pixels.

9. The imaging device according to claim 1, wherein
a power-supply terminal and a GND (ground) terminal connected to each of the two vertical scanning circuits are provided at one of both right and left ends of the pixel array in a horizontal direction.

10. An electronic apparatus comprising the imaging device according to claim 1.

11. An electronic apparatus comprising an imaging device including:
a pixel array including a plurality of pixels; and
two vertical scanning circuits configured to supply a driving signal to at least one of the plurality of pixels,
wherein the two vertical scanning circuits are configured to supply the driving signal when the electronic apparatus is in a rolling shutter mode, and
wherein one of the two vertical scanning circuits is configured to stop the supply of the driving signal when the electronic apparatus is in a global shutter mode.

12. The electronic apparatus according to claim 11, wherein the plurality of pixels are arranged in a matrix form.

13. The electronic apparatus according to claim 11, wherein the two vertical scanning circuits are respectively configured to drive at least one of the pixels in a vertical direction per row.

14. The electronic apparatus according to claim 11, wherein the rolling shutter mode allows a light charge generated by a photodiode to be read pixel by pixel or row by row.

15. The electronic apparatus according to claim 14, wherein the global shutter mode allows an exposure start and an exposure end to be performed on the pixels simultaneously.

16. The electronic apparatus according to claim 11, wherein one of the two vertical scanning circuits has a circuit to stop a supply of the pixel driving pulse to a driver of a transfer transistor, the transfer transistor being configured to transfer a charge accumulated in a photoelectric conversion part of each of the pixels.

17. The electronic apparatus according to claim 11, wherein
a power-supply terminal and a GND (ground) terminal connected to each of the two vertical scanning circuits are provided at one of both right and left ends of the pixel array in a horizontal direction.

* * * * *